(12) United States Patent
Dhinojwala et al.

(10) Patent No.: US 12,330,187 B2
(45) Date of Patent: Jun. 17, 2025

(54) UV-OVERPROTECTING IRIDESCENT COLORED CONTACT LENSES

(71) Applicant: The University of Akron, Akron, OH (US)

(72) Inventors: Ali Dhinojwala, Akron, OH (US); Saranshu Singla, Sangruer (IN)

(73) Assignee: The University of Akron, Akron, OH (US)

( * ) Notice: Subject to any disclaimer, the term of this patent is extended or adjusted under 35 U.S.C. 154(b) by 142 days.

(21) Appl. No.: 17/215,546

(22) Filed: Mar. 29, 2021

(65) Prior Publication Data

US 2021/0373358 A1 Dec. 2, 2021

Related U.S. Application Data

(60) Provisional application No. 63/032,156, filed on May 29, 2020.

(51) Int. Cl.
*B05D 3/00* (2006.01)
*B05D 1/00* (2006.01)
*B05D 1/18* (2006.01)
*B05D 3/14* (2006.01)
*C09B 69/10* (2006.01)
*G02B 5/22* (2006.01)
*G02B 5/28* (2006.01)
*G02C 7/04* (2006.01)
*G02C 7/10* (2006.01)

(52) U.S. Cl.
CPC .............. *B05D 3/002* (2013.01); *B05D 1/005* (2013.01); *B05D 1/18* (2013.01); *B05D 3/144* (2013.01); *B05D 3/145* (2013.01); *C09B 69/104* (2013.01); *G02B 5/223* (2013.01); *G02B 5/287* (2013.01); *G02C 7/04* (2013.01); *G02C 7/107* (2013.01); *B05D 2201/00* (2013.01); *G02C 2202/16* (2013.01)

(58) Field of Classification Search
CPC ......... G02B 1/043; G02B 5/285–5/287; G02B 5/22–5/223; G02C 7/049; G02C 7/10–7/108
See application file for complete search history.

(56) References Cited

U.S. PATENT DOCUMENTS

| 4,698,374 A | 10/1987 | Gallas |
| 5,036,115 A | 1/1991 | Gallas |
| 5,116,884 A | 5/1992 | Gallas |

(Continued)

OTHER PUBLICATIONS

Stavenga et al. "Polarized iridescence of the multilayered elytra of the Japanese jewel beetle, Chrysochroa fulgidissima". Philosophical Transactions: Biological Sciences, vol. 366, No. 1565, (2011); pp. 709-723.*

(Continued)

*Primary Examiner* — Prashant J Khatri
(74) *Attorney, Agent, or Firm* — Renner, Kenner, Greive, Bobak, Taylor & Weber Co. LPA

(57) ABSTRACT

In various embodiments, the present invention is directed to contact lenses that utilize a multilayer coating of alternating high RI materials, such as melanin or polydopamine (PDA) and other low RI materials to create tunable iridescent colors and contain melanin or similar materials that impart photoprotection due to their broadband UV-vis absorption spectrum and ability to quench radicals.

22 Claims, 6 Drawing Sheets

(56) References Cited

U.S. PATENT DOCUMENTS

2009/0323179 A1* 12/2009 Kawai ................ B32B 27/40
       252/589
2020/0109275 A1  4/2020 Jan et al.
2020/0110283 A1  4/2020 Jan et al.

OTHER PUBLICATIONS

Parchem Tetrahydrofurfuryl Methacrylate Datasheet. Retrieved Jun. 27, 2023.*
Dobrowolski, J.A. (eds. Bass et al.). "Chapter 42: Optical Properties of Films and Coatings", Handbook of Optics, vol. I: Fundamentals, Techniques, and Design, (1995); pp. 42.3-42.130.*
Yasuda, Takashi et al., Structural colors from Tio2/Sio2, Dyes and Pigments (2012), http://dxdoi:1016/j.dyepig.2011.08.006.
Yoshoka, Shinya et al., Phase Adjusting Layers in The Multilayer Reflector of a Jewel Beetle, Journal of the Physical Society of Japan (2012), http://journals.jps.jpby 030.101.154.45 on Dec. 14, 2020.
Chirila, Traian V. et al., Radiation-Absorbing Hydrogel-Melanin Blends, Journal of Applied Polymar Sceince, vol. 44-593-604 (1992), CCC 0021-8995/92/040593-12$04.00.

* cited by examiner

UV-OVERPROTECTING IRIDESCENT COLORED CONTACT LENSES

CROSS REFERENCE TO RELATED APPLICATIONS

This application claims the benefit of U.S. provisional patent application Ser. No. 63/032,156 entitled "UV-Protecting Iridescent Colored Contact Lenses," filed May 29, 2020, and incorporated herein by reference in its entirety.

STATEMENT REGARDING FEDERALLY SPONSORED RESEARCH OR DEVELOPMENT SUPPORT

This invention was made with government support under MURI FA9550-18-1-1042 awarded by the Air Force Office of Scientific Research. The government has certain rights in the invention.

FIELD OF THE INVENTION

One or more embodiments of the present invention relates to an iridescent color coating for a contact lens. In certain embodiments, the present invention is directed to a layered iridescent structural color coating for contact lenses.

BACKGROUND OF THE INVENTION

With the growing fashion of matching clothes and accessories including contact lenses, there is a significant emphasis on creating contact lenses with tunable colors. Previously, colored contact lenses have been created by incorporating colorant into the polymer composition used for making lenses or by coating the surface of the contact lens with a colored layer. However, these approaches suffer from two major limitations. First, the color may fade over time due to photodegradation of the colorant, and second, the coating may wear off due to poor adhesion between the lens surface and coating as the wearer repeatedly touches the lens surface while wearing and removing contact lenses. Also, leaching of this colorant to the wearer's eye may result in allergies or infections.

Recently BenQ Materials Corporation described an approach to enhance the adhesion of colorant coating to hydrophilic contact lenses and address the leaching problem. (See, e.g., U.S. patent application publication nos. 2020/0109275A1 and 2020/0110283A1) This approach involved adding colorant to the base polymerized aqueous solution of dopamine (i.e. polydopamine) to prepare a polydopamine-modified colorant for enhanced adhesion to hydrophilic contact lenses. However, the color of the contact lens is still a consequence of the absorption of light by the colorant, thus, it would fade over time due to photodegradation by UV light present in the solar spectrum. Hence, an alternative approach would be desirable to overcome this problem.

Melanin is a widespread biological pigment found in various taxa and exhibits unique properties including a high RI, broadband absorption from UV to visible to infrared, radical quenching ability, and metal ion chelation ability. Melanin can be categorized into different classes: eumelanin, pheomelanin, and allomelanin, depending upon the monomer and the enzymes involved in its synthesis process. Synthetically, melanin can be prepared in the lab by polymerizing various monomeric precursors such as dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, and 1,8-dihyroxynapthalene (DHN), as listed below. Various chemical structures of the different monomers that can be utilized to create synthetic melanin are shown below.

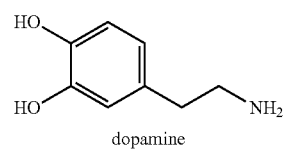

dopamine

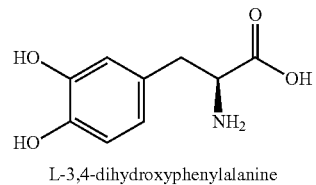

L-3,4-dihydroxyphenylalanine

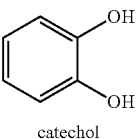

catechol

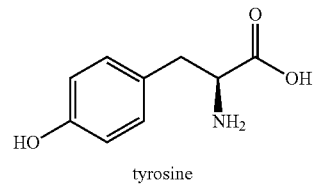

tyrosine

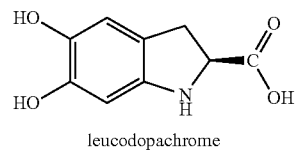

leucodopachrome

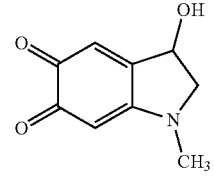

adrenochrome

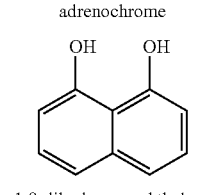

1,8-dihydroxynaphthalene

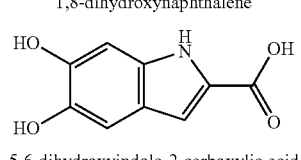

5,6-dihydroxyindole-2-carboxylic acid

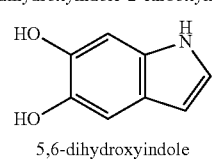

5,6-dihydroxyindole

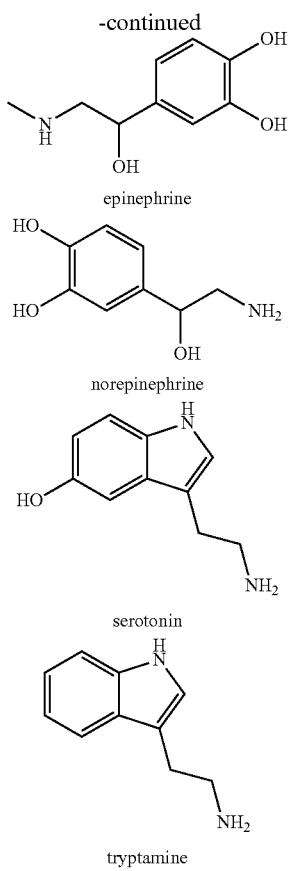

epinephrine norepinephrine serotonin tryptamine

The polymerization can be catalyzed using enzymes, various bases (Tris buffer, sodium hydroxide (NaOH), sodium bicarbonate buffer (NaHCO$_3$/Na$_2$CO$_3$), phosphate buffer, ammonia, Bicine buffer) and other chemical oxidants (such as sodium periodate, ammonium per(oxodi)sulfate, potassium permanganate, copper sulfate, and Fe (III)). Melanin has been synthesized both in the form of particles and in the form of coating using these various precursors. But, a significantly large amount of work has been done specifically on polydopamine (PDA) coating since Lee et al. published the article on PDA coating in *Science* in 2007. (See, Lee, H., Dellatore, S. M., Miller, W. M. and Messersmith, P. B., 2007. Mussel-inspired surface chemistry for multifunctional coatings. *Science*, 318(5849), pp. 426-430, the disclosure of which is incorporated herein by reference in its entirety).

Previously, melanin has been used to create contact lenses with enhanced photoprotection and antimicrobial properties. Work has been done on polymerizing various precursors to melanin polymers, which are then deposited as a coating on the object or mixed with the polymer matrix to incorporate melanin in the bulk and create tinted contact lenses and plastics with improved UV-protection. Also, melanin coated hydrogel contact lenses for providing enhanced photoprotection to the eye have been produced by dip coating the contact lens in an aqueous solution of an epinephrine precursor. And, more recently, contact lenses have been coated with PDA to deposit metal nanoparticles or antimicrobials for preventing microbial infections to the eye. However, no work has been done on creating multilayer-coatings with natural and synthetic melanin for creating iridescent structural color contact lenses.

In nature, structural colors have been observed that are created using periodically arranged nanostructures composed of media with varying RI via scattering or interference. Examples include the blue Morpho butterfly, Japanese jewel beetle, peacock and turkey feathers, and several others. Inspired by these natural structural colors, several artificial structural color materials have been developed with films, fibers, and particles. In particular, the jewel beetle (FIG. 1A-D) has inspired the design of multilayer coatings with materials having high RI contrast to create structural colors. Yasuda et al. created a multilayer assembly of silica (low RI) and titania (high RI) to create structural colors for applications in paints. However, no one has explored creating such multilayer assemblies with natural and synthetic melanin.

What is needed in the art is a UV protective contact lens coating that provides iridescent structural colors using multilayer assemblies with natural and synthetic melanin.

SUMMARY OF THE INVENTION

In one or more embodiments, the present invention provides a UV protective contact lens coating that provides iridescent structural colors multilayer assemblies with natural and synthetic melanin. The growing fashion of matching contact lenses with your clothing has created a huge demand for colored contact lenses. Traditional approaches involving the use of a colorant to modify the color of the contact lens suffer from limitations including discoloring over time and poor stability. In various embodiments, the present invention provides iridescent structural color based colored contact lenses with added advantage of ultraviolet (UV) protection. The iridescent color is created using a multilayer assembly of high refractive index (RI) synthetic or natural melanin coating alternated with other low RI index materials. To achieve tunable colors, both the thickness and RI of the two layers are varied. In various embodiments, the broadband UV-visible absorption spectrum of melanin along with its ability to quench radicals would impart photoprotection to the eye.

In a first aspect, the present invention is directed to an ultra-violet (UV) light protective contact lens comprising: a translucent lens portion that is sized to fit on the front of an eye; and a translucent iridescent coating comprising a plurality of alternating low refractive index (RI) and high RI layers adhered to the translucent lens portion; wherein the difference between the RI of the high RI layers and the low RI layers of the translucent iridescent coating is from about 0.2 to about 0.7; wherein each of the low RI and high RI layers reflect light in the visible spectrum and the iridescent coating produces one or more iridescent colors by the constructive interference of the light reflected by the low RI and high RI layers, and wherein one or more of the high RI layers absorbs UV light. In some of these embodiments, the low RI layers have an RI of from about 1.3 to about 1.6. In some of these embodiments, the high RI layers have an RI of from about 1.5 to about 2.0.

In one or more embodiments, the UV light protective contact lens of the present invention includes any one or more of the above referenced embodiments of the first aspect of the present invention wherein the low RI layers have a thickness of from about 5 nm to about 600 nm. In one or more embodiments, the UV light protective contact lens of the present invention includes any one or more of the above referenced embodiments of the first aspect of the present invention wherein the high RI layers have a thickness of from about 5 nm to about 600 nm.

In one or more embodiments, the UV light protective contact lens of the present invention includes any one or more of the above referenced embodiments of the first aspect of the present invention wherein the high refractive index layers comprise natural (eumelanin and allomelanin) and synthetic melanin obtained by polymerizing different precursors: dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) or a combination thereof. In one or more embodiments, the UV light protective contact lens of the present invention includes any one or more of the above referenced embodiments of the first aspect of the present invention wherein the high RI layers comprise natural melanin, synthetic melanin, eumelanin allomelanin, PDA or DHN melanin or polynorepinephrine, polyDOPA, or polyepinephrine.

In one or more embodiments, the UV light protective contact lens of the present invention includes any one or more of the above referenced embodiments of the first aspect of the present invention wherein the low RI layers comprise silicon dioxide, tetramethylmalonamide (TMMA), chitosan, polystyrene, poly(methyl methacrylate), polyelectrolytes, polycarbonates, polydimethylsiloxane, hydrogels, keratin, or a combination thereof. In one or more embodiments, the UV light protective contact lens of the present invention includes any one or more of the above referenced embodiments of the first aspect of the present invention wherein the low refractive index layers comprise silicon dioxide or tetramethylmalonamide (TMMA), biopolymers such as chitosan and keratin, organic polymers such as polystyrene, poly(methyl methacrylate), polyelectrolytes, polycarbonates, polydimethylsiloxanes, hydrogels.

In one or more embodiments, the UV light protective contact lens of the present invention includes any one or more of the above referenced embodiments of the first aspect of the present invention wherein the translucent iridescent coating comprises from 2 to 15 alternating low RI and high RI layers.

In one or more embodiments, the UV light protective contact lens of the present invention includes any one or more of the above referenced embodiments of the first aspect of the present invention wherein the high RI layers comprise an organic polymer comprising the polymerized residue of a monomer selected from the group consisting of dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) and combinations thereof.

In one or more embodiments, the UV light protective contact lens of the present invention includes any one or more of the above referenced embodiments of the first aspect of the present invention wherein the high RI and low RI layers are applied to the contact lens portion by sequential polymerization or spin coating. In one or more embodiments, the UV light protective contact lens of the present invention includes any one or more of the above referenced embodiments of the first aspect of the present invention wherein the high RI and low RI layers are applied to the contact lens portion by spin coating.

In a second aspect, the present invention is directed to an iridescent UV protective coating for a contact lens comprising: a plurality of alternating low refractive index (RI) and high RI layers, the difference between the RI of the high RI layers and the low RI layers being from about 0.2 to about 0.7 wherein each of the low RI and high RI layers reflect light in the visible spectrum and the iridescent coating produces one or more iridescent colors by the constructive interference of the light reflected by the low RI and high RI layers, and wherein one or more of the high RI layers absorbs UV light. In some of these embodiments, the iridescent color produced by the iridescent UV protective coating may be tuned by varying the thicknesses of the low RI and high RI layers.

In one or more embodiments, the iridescent UV protective coating of the present invention includes any one or more of the above referenced embodiments of the second aspect of the present invention wherein the low RI layers have an RI of from about 1.3 to about 1.6. In one or more embodiments, the iridescent UV protective coating of the present invention includes any one or more of the above referenced embodiments of the second aspect of the present invention wherein the high RI layers have an RI of from about 1.5 to about 2.0. In one or more embodiments, the iridescent UV protective coating of the present invention includes any one or more of the above referenced embodiments of the second aspect of the present invention wherein the translucent iridescent coating comprises from 2 to 15 alternating low RI and high RI layers.

In one or more embodiments, the iridescent UV protective coating of the present invention includes any one or more of the above referenced embodiments of the second aspect of the present invention wherein the high refractive index layers comprise natural (eumelanin and allomelanin) and synthetic melanin, polydopamine (PDA), polyDOPA, poly (DHN) or DHN melanin, polynorepinephrine, polyepinephrine, polytyrosine, or combinations thereof. In one or more embodiments, the iridescent UV protective coating of the present invention includes any one or more of the above referenced embodiments of the second aspect of the present invention wherein the low RI layers comprise silicon dioxide, tetramethylmalonamide (TMMA), chitosan, polystyrene, poly(methyl methacrylate), polyelectrolytes, polycarbonates, polydimethylsiloxane, hydrogels, keratin, or a combination thereof.

In one or more embodiments, the iridescent UV protective coating of the present invention includes any one or more of the above referenced embodiments of the second aspect of the present invention wherein the high RI layers comprise an organic polymer comprising the polymerized residue of a monomer selected from the group consisting of dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) and combinations thereof.

In another aspect, the present invention is directed to a method for forming the UV light protective contact lenses described above comprising: rinsing a contact lens having a surface to be coated in deionized water; immersing a portion of the surface of a contact lens to be coated in a basic solution of dopamine hydrochloride for from about 1 hrs to about 24 hrs to deposit a layer of PDA on the surface of the contact lens; sonicating the contact lens to remove any loosely bound PDA oligomers from the surface of the contact lens; forming a solution of a silica precursor selected from the group consisting of tetraethyl orthosilicate (TEOS) and tetramethyl orthosilicate (TMOS) in ethanol and water and adding a silanation catalyst; coating the outer surface of the layer of PDA with the solution to form a layer of silicon dioxide; and repeating the previous steps as necessary to form a desired number of layers of PDA and silicon dioxide.

In still another aspect, the present invention is directed to a comprising: applying a plasma treatment or corona treatment to a contact lens to be coated to increase the surface energy of the contact lens and promote wetting; spin coating a solution of natural or synthetic melanin dissolved in a 2:1 solution of ammonium hydroxide and water onto a surface of the contact lens to form a layer of natural or synthetic melanin on the contact lens; applying a plasma treatment or corona treatment to the layer of natural or synthetic melanin to increase the surface energy and promote wetting; spin coating a silica sol solution created by mixing a silica precursor selected from the group consisting of tetramethyl orthosilicate (TMOS) or tetraethyl orthosilicate (TEOS), water, ethanol, and a silanation catalyst onto the layer of natural or synthetic melanin for forming a layer of silicon dioxide over the layer of natural or synthetic melanin; applying a plasma treatment or corona treatment to the layer of silicon dioxide to increase the surface energy and promote wetting and repeating the previous steps as necessary to form a desired number of layers of natural or synthetic melanin and silicon dioxide.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

Figure 1A:
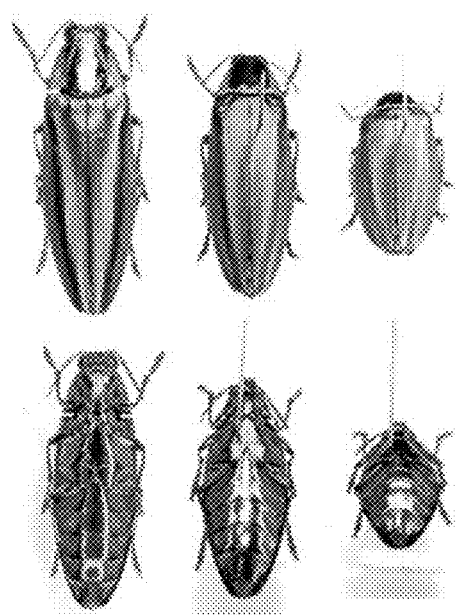
FIGS. 1A-D are images showing the angle dependence of the color in jewel beetles (FIG. 1A) and Optical (FIG. 1B), SEM (FIG. 1C), and TEM (FIG. 1D) image of the elytron surface and cross-section, respectively. (Images from Kinoshita, S., S. Yoshioka, and J. Miyazaki. "Physics of structural colors." *Reports on Progress in Physics* 71, no. 7 (2008): 076401, the disclosure of which is incorporated herein by reference).
Figure 1B:
Figure 1C:
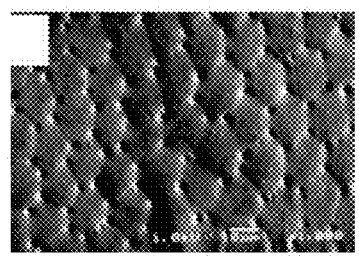
Figure 1D:
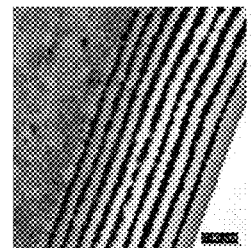
Figure 2:
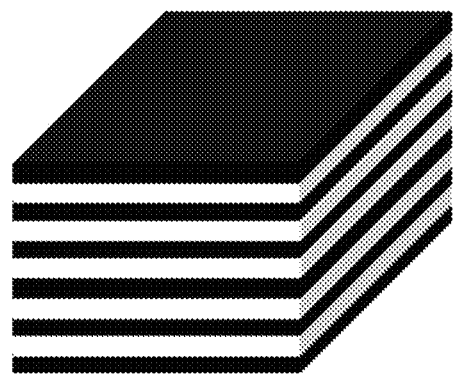
FIG. 2 is a schematic of the multilayer assembly of high RI and low RI layers as would be applied to a contact lens.

In various embodiments, the present invention is directed to contact lenses that utilize a multilayer coating of alternating high RI melanin and other low RI materials to create tunable iridescent colors and contain melanin or similar materials that impart photoprotection due to their broadband UV-vis absorption spectrum and ability to quench radicals. In one or more embodiments, the high RI melanin layer (RI of about 1.5-2.0 depending upon the starting precursor) are alternated with low RI materials (silica, titania, polymers, and other organics and inorganics with RI of about 1.3-1.6) to create multilayer coatings. (See, FIG. 2) The colored contact lenses created using this method will not fade over time since the observed color is dictated by the multilayer assembly (i.e. structure) rather than by the colorant. The iridescent color may be tuned by varying two parameters: (1) the choice of the two alternative layers with varying RIs; and (2) by controlling the thickness of these individual layers. For instance, if the melanin layer is to be alternated with other material layer of 1.5 RI, either silica or chitosan could be chosen. Alternatively, other RI materials can be chosen. Since melanin demonstrates a broadband UV-vis absorption and has the ability to quench radicals, the use of melanin layers enhances the photoprotection ability of the contact lenses.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that at least some of these features, elements or components maybe used in combination together.

In a first aspect, the present invention is directed to an iridescent and ultra-violet (UV) light protective contact lens comprising: a translucent lens portion that is sized to fit on the front of an eye and a translucent iridescent coating comprising a plurality of alternating low refractive index (RI) and high RI layers adhered to translucent lens portion. The contact lens used with the present invention is not particularly limited and may include any commercially available contact lens provided the coatings are applied after the contact lens is fabricated to the desired shape. Suitable contact lenses include, without limitation, hard, soft, rigid gas permeable hard, hydrogel, silicone hydrogel, poly(hydroxyethyl methacrylate) (pHEMA), hypergel, and PMMA lenses.

As will be apparent, the translucent lens portion to which the iridescent coating is adhered will include some or all of the portion of the contact lens through which light passes into the eye during ordinary wear. The iridescent coating is, of course, translucent and is formed from alternating layers of material having a high refractive index (RI) and a low RI. In some embodiments, the high RI material will be directly adjacent to the outer surface of the contact lens, but this need not be the case. In various embodiments, the iridescent coating will have from 2 to 15 alternating low RI and high RI layers. In some embodiments, the iridescent coating will have from 2 to 14, in other embodiments, from 2 to 12, in other embodiments, from 2 to 10, in other embodiments, from 2 to 8, in other embodiments, from 2 to 6, in other embodiments, from 2 to 4, in other embodiments, from 4 to 15, in other embodiments, from 6 to 15, and in other embodiments, from 8 to 17 alternating low RI and high RI layers. In some embodiments, the iridescent coating will have from 4 to 8 alternating low RI and high RI layers. Here, as well as elsewhere in the specification and claims, individual range values can be combined to form additional non-disclosed ranges.

The terms low and high are used herein as relative terms when applied to the RI of a materials forming the iridescent coating. The layers formed of the material having the higher RI will be referred to herein as the "high RI layers" and the others as the "low RI layers." In various embodiments, the difference between the RI of the high RI layers and the low RI layers of the iridescent coating is from about 0.2 to about 0.7. In some embodiments, the difference between the RI of the high RI layers and the low RI layers is from about 0.2 to about 0.6, in other embodiments, from about 0.2 to about 0.5, in other embodiments, from about 0.2 to about 0.4, in other embodiments, from about 0.3 to about 0.7, in other embodiments, from about 0.4 to about 0.7, in other embodiments, from about 0.5 to about 0.7, and in other embodiments, from about 0.6 to about 0.7. Here, as well as elsewhere in the specification and claims, individual range values can be combined to form additional non-disclosed ranges.

In some embodiments, the low RI layers of the iridescent coating will have an RI of from about 1.3 to about 1.6. In some embodiments, the low RI layers will have an RI of from about 1.3 to about 1.5, in other embodiments, from about 1.3 to about 1.4, in other embodiments, from about 1.4 to about 1.6, and in other embodiments, from about 1.5 to 1.6. In one or more embodiments, the high RI layers will have an RI of from about 1.5 to about 2.0. In some embodiments, the high RI layers will have an RI of from about 1.5 to about 1.9, in other embodiments, from about 1.5 to about 1.8, in other embodiments, from about 1.5 to about 1.7, in other embodiments, from about 1.5 to about 1.6, in other embodiments, from about 1.6 to about 2.0, in other embodiments, from about 1.7 to about 2.0, and in other embodiments, from about 1.8 to about 2.0. Here, as well as elsewhere in the specification and claims, individual range values can be combined to form additional non-disclosed ranges.

In various embodiments, the high RI layers are formed from any translucent organic polymer with an RI in the range described above but is preferably a natural or synthetic form of melanin. As will be understood by those of skill in the art, both natural and synthetic melanin absorb UV light and can provide significant UV protection, but the absolute UV absorbance may differ across different types of melanin. It is preferred that at least one of the high RI layers contain an UV absorbent material such as natural or synthetic melanin.

Suitable organic polymers for use in the high RI layers of the iridescent coating may include, without limitation, different types of natural (eumelanin and allomelanin extracted from various natural sources such as cuttlefish ink, black knot fungus, black garlic, and others) and synthetic melanins. (polydopamine (PDA), polyDOPA, poly(DHN), polynorepinephrine, polyepinephrine, polytyrosine, polytryptamine, and others) or combinations thereof. In one or more embodiments, the high RI layers will contain an organic polymer comprising the polymerized residue of an organic monomer such as dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) and combinations thereof. In some embodiments, the high RI layers of the iridescent coating will comprise natural melanin such as eumelanin and allomelanin. In some embodiments, the high RI layers of the iridescent coating will comprise PDA.

In some embodiments, the high RI layers will comprise a natural or synthetic melanin and a small amount of polymer binder. In some of these embodiments, these high RI layers will comprise from 0% to about 25% polymer binder. In some embodiments, the high RI layers will comprise from about 0.001% to about 25%, in other embodiments, from about 1% to about 20%, in other embodiments, from about 1% to about 15%, in other embodiments, from about 1% to about 10%, in other embodiments, from about 1% to about 5%, in other embodiments, from about 2% to about 25%, in other embodiments, from about 5% to about 25%, in other embodiments, from about 10% to about 25%, in other embodiments, from about 15% to about 25%, and in other embodiments, from about 20% to about 25%, polymer binder. In some embodiments, the high RI layers will comprise any polymer binder. Here, as well as elsewhere in the specification and claims, individual range values can be combined to form additional non-disclosed ranges. Suitable polymer binders may include, without limitation, hydrophilic polymers such as polyvinyl pyrrolidone (PVP), poly(hydroxyethyl methacrylate) (pHEMA), polyethylene oxide (PEO), poly(vinyl alcohol) or combinations thereof.

The low RI layer may be formed of a translucent material having an RI as set forth above, provided that it can be dissolved in a solvent that does not dissolve the melanin layer. In some embodiments, the low RI layer may be made from silicon dioxide ($SiO_2$), alumina, tetramethylmalonamide (TMMA), chitosan, polystyrene (PS), poly(methyl methacrylate) (PMMA), polyelectrolytes, polycarbonates, polydimethylsiloxane (PDMS), hydrogels, keratin, or a combination thereof. In some embodiments, the low RI layer may be formed of biopolymers such as chitosan and keratin. In some other embodiments, the low RI layer may be made from organic polymers such as polystyrene, poly(methyl methacrylate), polyelectrolytes, polycarbonates, polydimethylsiloxane (PDMS) or hydrogels.

In various embodiments, the low RI and high RI layers will reflect light in the visible spectrum and the iridescent colors are produced by the constructive interference of the light reflected by the low RI and high RI layers. As will be apparent to those of skill in the art, the wavelength of the light reflected by the low and high RI layers and, therefore, the iridescent color produced by the iridescent coating will depend upon the thicknesses of the individual layers. Accordingly, the iridescent color produced by the iridescent UV protective coating may be tuned by varying the thicknesses of the low RI and high RI layers. The colors produced will be iridescent because the wavelength of light reflected by the low and high RI layers will vary with the angle at which the light strikes the iridescent coating. (See FIG. 3 and FIG. 8A)

In various embodiments, the optimum thickness of the high and low RI layers may be calculated using a genetic and machine learning algorithm (GMLA) based on reflection and transmission of light at the boundary using Maxwell's equations. See, Born, M. and Wolf, E., 2013. *Principles of optics: electromagnetic theory of propagation, interference and diffraction of light*. Elsevier, the disclosure of which in incorporated herein by reference in its entirety. In various embodiments, the GMLA may be constructed as set forth in Artificial Intelligence, A Modern Approach, by Stuart J. Russell and Peter Norvig Third Edition, Publisher Pearson India Education Services, the disclosure of which in incorporated herein by reference in its entirety. In various embodiments, the GMLA optimizes the reflectance for a particular color and minimizes the reflectance at other colors to enhance saturation and brightness and maximize UV absorption. In some of these embodiments, the GMLA code may also optimize the type of materials to use for those layers, their thickness, and the number of layers. As will be apparent, the algorithm works by using a genetic algorithm as described in Russell and Norvig and explores the variable space (RI, thickness, and number of layers) to provide options for maximizing reflectance in a certain wavelength region and minimizing reflectance in other regions. The melanin-based coatings have long been used as an absorbing and high RI layer. One of ordinary skill in the art will be able to calculate optimum thickness of the high and low RI layers of the coating without undue experimentation. The low RI layers can be polymers such as polystyrene (PS), poly(methyl methacrylate) (PMMA), polycarbonate, poly(dimethyl siloxane) (PDMS) or inorganic oxides such as alumina, silica, and titanium dioxide, as set forth above. In these embodiments, the RI contrast needed for brighter and more saturated colors may also be optimized by the GMLA. Multiple optimum solutions based on the GMLA are shown in Table 1 for colors in red, green, and blue regions on a silicon substrate by using alternating layers of black knot fungal (SKF) melanin and PS. FIGS. 4A-C, 5A-B, 6A-B show the absorbance, transmission, and reflectance plotted as a function of wavelength for different multilayer options to obtain red, green, and blue, respectively. The GMLA also provides the optimum material composition, thicknesses, and number of layers to use for the desired color on other polymeric substrates such as those used for making contact lenses.

TABLE 1

|  | Red Option 1 (nm) | Red Option 2 (nm) | Red Option 3 (nm) | Green Option 1 (nm) | Green Option 2 (nm) | Blue Option 1 (nm) | Blue Option 2 (nm) |
| --- | --- | --- | --- | --- | --- | --- | --- |
| Air (Layer 8) | 0 | 0 | 0 | 0 | 0 | 0 | 0 |
| PS (Layer 7) | 56 | 26 | 8 | 15 | 172 | 124 | 123 |
| BKF melanin (Layer 6) | 57 | 106 | 93 | 39 | 46 | 17 | 6 |
| PS (Layer 5) | 114 | 82 | 127 | 123 | 118 | 192 | 127 |
| BKF melanin (Layer 4) | 90 | 114 | 114 | 40 | 47 | 9 | 39 |
| PS (Layer 3) | 104 | 122 | 94 | 114 | 254 | 69 | 93 |
| BKF melanin (Layer 2) | 249 | 215 | 222 | 8 | 16 | 4 | 2 |
| $SiO_2$ (Layer 1) | 2 | 2 | 2 | 2 | 2 | 2 | 2 |
| Silicon (Layer 0) | 0 | 0 | 0 | 0 | 0 | 0 | 0 |

As will be apparent, both the high and low RI layers must be very thin. In various embodiments, the high and low RI layers of the iridescent coating of the iridescent and ultraviolet (UV) light protective contact lens of the present invention will have a mean thickness of from about 5 nm to about 600 nm. In some embodiments, the high and low RI layers will have a mean thickness of from about 5 nm to about 500 nm, in other embodiments, from about 5 nm to about 400 nm, in other embodiments, from about 5 nm to about 300 nm, in other embodiments, from about 5 nm to about 200 nm, in other embodiments, from about 5 nm to about 100 nm, in other embodiments, from about 5 nm to about 50 nm, in other embodiments, from about 25 nm to about 600 nm, in other embodiments, from about 100 nm to about 600 nm, in other embodiments, from about 200 nm to about 600, in other embodiments, from about 300 nm to about 600 nm, in other embodiments, from about 400 nm to about 600 nm, and in other embodiments, from about 500 nm to about 600 nm. Here, as well as elsewhere in the specification and claims, individual range values can be combined to form additional non-disclosed ranges. In some embodiments, the high and low RI layers of the iridescent coating of the iridescent and ultra-violet (UV) light protective contact lens of the present invention will have a mean thickness of from about 30 nm to about 250 nm.

In some embodiments, all of the layers in the iridescent coating of the iridescent and ultra-violet (UV) light protective contact lens of the present invention will have essentially the same thickness, but this need not be the case. In some embodiments, the thickness of the low IR layers and the thickness of the high IR layers of the iridescent coating will be different as shown in Table 1. Similarly, in some embodiments all layers of the same type (i.e. all low IR layers or all high IR layers) will have approximately the same thickness, but again that need not be the case.

The low IR layers and high IR layers of the iridescent coating of the ultra-violet (UV) light protective contact lens of the present invention can be formed using any conventional method capable of applying the layers at controlled thicknesses. Suitable methods for applying the layers to contact lens and/or previous layers may include, without limitation, spin coating, in situ polymerization of organic monomers, and flow coating. As will be apparent, the method used may depend upon the particular material being applied.

As will be apparent, the selected contact lens should be clean before application of the coating. In some embodiments, the surface of the contact lens may be rinsed in deionized water. In some embodiments, a plasma treatment or a corona treatment may be applied to the contact lens to be coated to increase the surface energy of said contact lens and promote wetting and adhesion of subsequent layers.

In some embodiments, the high RI layers my be formed by in situ polymerization on the surface of either the contact lens or an earlier applied low RI layer. In these embodiments, a monomer to be polymerized to form an organic polymer having a high RI as discussed above is dissolved in a basic solution. In some embodiments, the monomer may include, without limitation, dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) or a combination thereof. In some embodiments, the monomer may have one or more of the following monomers:

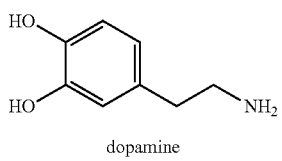

dopamine

-continued

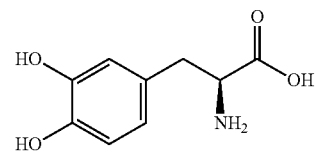

L-3,4-dihydroxyphenylalanine

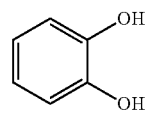

catechol

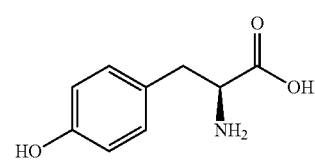

tyrosine

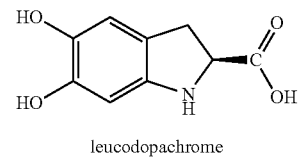

leucodopachrome

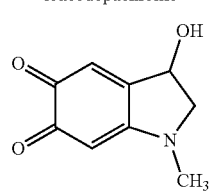

adrenochrome

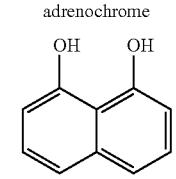

1,8-dihydroxynaphthalene

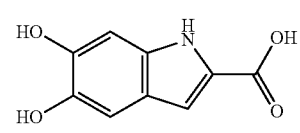

5,6-dihydroxyindole-2-carboxylic acid

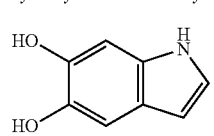

5,6-dihydroxyindole

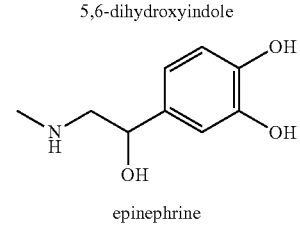

epinephrine

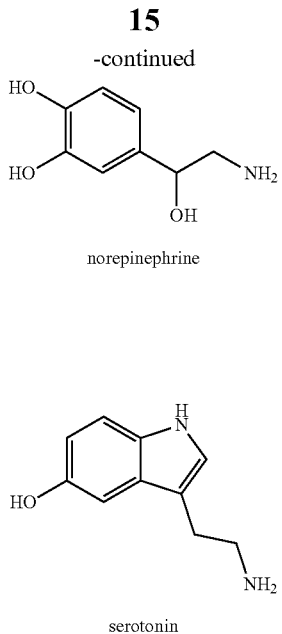

norepinephrine

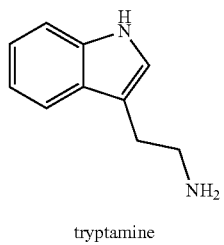

serotonin

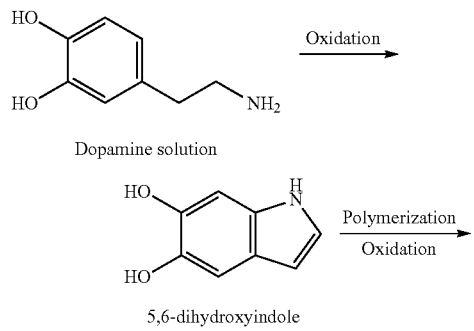

tryptamine

As will be apparent, the dissolved monomer may in some cases be present in the basic solution in its salt form. In some embodiments, for example, the basic solution will contain dopamine hydrochloride.

In some embodiments, for example, a dopamine monomer may be polymerized in situ to form a high RI PDA coating using the mechanism shown in Scheme 1 below.

Scheme 1
Reaction mechanism of polydopamine melanin formation from dopamine melanin presursor

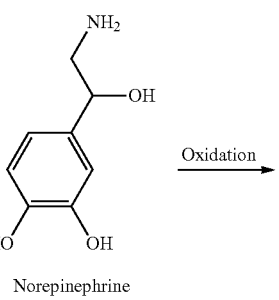

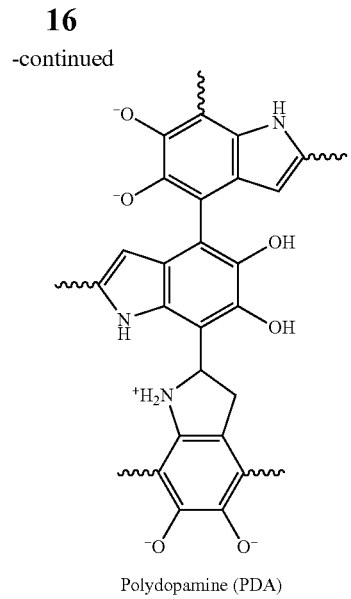

Polydopamine (PDA)

In some other embodiments, for example, a norepinephrine monomer may be polymerized in situ to form a high RI PDA coating using the mechanism shown in Scheme 2, below.

Scheme 2
Reaction mechanism of polynorepinephrine melanin formation from norepinephrine melanin precursor.

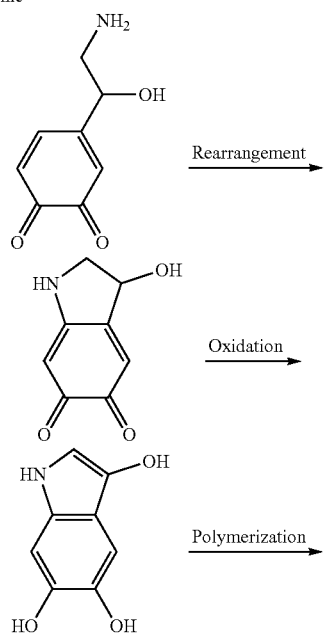

-continued

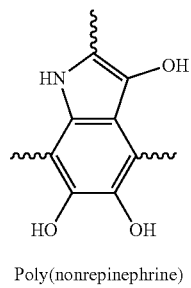

Poly(nonrepinephrine)

In one or more embodiments, the basic solution will comprise a suitable aqueous base. Suitable bases may include, without limitation, sodium hydroxide (NaOH), ammonium hydroxide (NH$_4$OH), potassium hydroxide (KOH), and combinations thereof. In one or more embodiments, the basic solution will have a pH of from about 8 to about 10. In some embodiments, the pH of the basic solution may be adjusted using a suitable buffer, as is well known in the art. In some of the embodiments, the pH may be adjusted with a Tris or sodium bicarbonate buffer. Here, as well as elsewhere in the specification and claims, individual range values can be combined to form additional non-disclosed ranges.

In one or more embodiments, the polymerization of various melanin precursors will be initiated by using oxidants such as sodium periodate, ammonium per(oxodi)sulfate, potassium permanganate, copper sulfate, and Fe (III).

In one or more of these embodiments, the portion of the contact lens to be coated is immersed in the basic solution for from about 1 hour to about 24 hours to allow the monomer to polymerize on the surface being coated. As will be apparent, the thickness of the coating will be affected by such things as the coating time, the type of the monomer chosen, the concentration of monomer solution and the strength of the particular base or oxidant being used. In one or more embodiments, the monomer concentration in the basic solution may be from about 0.1 mg/mL to about 10 mg/mL. In some embodiments, the monomer concentration in the basic solution may be from about 0.5 mg/mL to about 10 mg/mL, in other embodiments, from about 1 mg/mL to about 10 m g/mL, in other embodiments, from about 2 mg/mL to about 10 m g/mL, in other embodiments, from about 3 mg/mL to about 10 m g/mL, in other embodiments, from about 5 mg/mL to about 10 m g/mL, in other embodiments, from about 7 mg/mL to about 10 m g/mL, in other embodiments, from about 0.1 mg/mL to about 9 m g/mL, in other embodiments, from about 0.1 mg/mL to about 8 m g/mL, in other embodiments, from about 0.1 mg/mL to about 7 m g/mL, in other embodiments, from about 0.1 mg/mL to about 6 m g/mL, in other embodiments, from about 0.1 mg/mL to about 5 m g/mL, and in other embodiments, from about 0.1 mg/mL to about 4 m g/mL. On some embodiments, the monomer concentration in the basic solution will be about 0.5 mg/mL. Here, as well as elsewhere in the specification and claims, individual range values can be combined to form additional non-disclosed ranges.

Oligomers that are not fully adhered to the surface of the contact lens or earlier applied low RI layer may be removed by any method known in the art for that purpose, but are preferably removed by sonication. The surface of the layer applied may then be cleaned as set forth above, to allow for the next layer.

In some other embodiments, the high RI layers may also be formed by spin coating using conventional techniques. In these embodiments, a basic solution containing the solubilized melanin that will form the high RI layer is spin coated on to the surface of either the contact lens or an earlier applied low RI layer. The basic solution used for spin coating will comprise a high RI natural and synthetic melanin and an aqueous ammonium hydroxide base. In various embodiments, the concentration of the high RI material in the basis solution will be from about 10 mg/ml to about 100 mg/mL. In some embodiments, the concentration of the high RI material in the basis solution will be from about 20 mg/ml to about 100 mg/mL, in other embodiments, from about 30 mg/mL to about 100 mg/mL, in other embodiments, from about 40 mg/mL to about 100 mg/mL, in other embodiments, from about 50 mg/mL to about 100 mg/mL, in other embodiments, from about 60 mg/mL to about 100 mg/mL, in other embodiments, from about 70 mg/mL to about 100 mg/mL, in other embodiments, from about 10 mg/mL to about 90 mg/mL, in other embodiments, from about 10 mg/mL to about 80 mg/mL, in other embodiments, from about 10 mg/mL to about 70 mg/mL, in other embodiments, from about 10 mg/mL to about 60 mg/mL, in other embodiments, from about 10 mg/mL to about 50 mg/mL, in other embodiments, from about 10 mg/mL to about 40 mg/mL Here, as well as elsewhere in the specification and claims, individual range values can be combined to form additional non-disclosed ranges.

As set forth above, suitable high RI organic polymers may include, without limitation, natural melanin (eumelanin and allomelanin extracted from natural sources), synthetic melanin (polydopamine (PDA), polyDOPA, poly(DHN) or DHN melanin, polynorepinephrine, polyepinephrine, polytyrosine), or combinations thereof. In some embodiments, the basic solution used for spin coating will comprise natural melanin or synthetic melanin (e.g. PDA), or a combination thereof. In some embodiments, the basic solution used for spin coating will comprise ammonium hydroxide. In some of these embodiments, basic solution used for spin coating comprises natural or synthetic melanin dissolved in a 2:1 solution of ammonium hydroxide and water. As will be understood by those of skill in the art, the coating thickness can be adjusted by controlling the spinning speed or the concentration of the high RI material being used.

In various embodiments, the low RI layers may be applied to either the contact lens or an earlier applied high RI layer using any method known in the art for doing so that can provide layers having controlled thicknesses as set forth above. Again, suitable low RI materials may include silicon dioxide, tetramethylmalonamide (TMMA), chitosan, polystyrene, poly(methyl methacrylate), polyelectrolytes, polycarbonates, polydimethysiloxane, hydrogels, keratin, or a combination thereof, as set forth above. In some embodiments, the low RI layers may be applied to the contact lens or high RI layer using the well-established sol-gel Stober process. (See, e.g., Yasuda, T., Nishikawa, K. and Furukawa, S., 2012. Structural colors from TiO$_2$/SiO$_2$ multilayer flakes prepared by sol-gel process. *Dyes and Pigments*, 92(3), pp. 1122-1125, the disclosure of which in incorporated herein by reference in its entirety). In in one or more of these embodiments, a coating solution comprising tetraethyl orthosilicate (TEOS) or tetramethyl orthosilicate (TMOS) is dissolved in a suitable solvent or cosolvent solution such as ethanol and water, and a silanation catalyst, such as HCl or HNO$_3$ is prepared and applied to the lens by spin coating or dip coating.

In one or more embodiments, the silica precursor (tetraethyl orthosilicate, TEOS or tetramethyl orthosilicate, TMOS) will undergo hydrolysis and polymerize in situ to form a $SiO_2$ low RI layer using the mechanism shown in Scheme 3 below.

Scheme 3
Schematic of the hydrolysis reaction of TEOS to form silica.

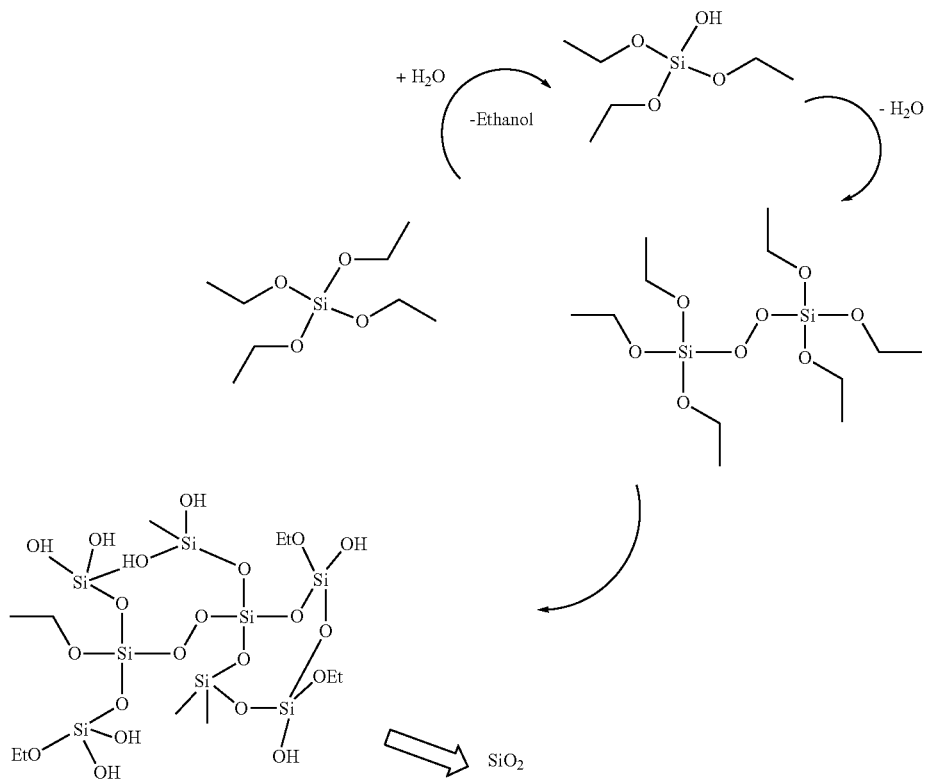

In some other embodiments, the high RI melanin layer can be deposited on the lens surface by spin coating the natural or synthetic melanin solution using known spin coating techniques. As will be apparent, the thickness of the layers can be tuned by changing either the coating speed (1000-3000 rpm) or the concentration of low RI material in the coating solution. In some embodiments, the coating solution may be prepared as set forth in Bothnia, J. P., De Boor, J., Divakar, U., Schwenn, P. E. and Meredith, P., 2008. Device-quality electrically conducting melanin thin films. *Advanced Materials*, 20(18), pp.3539-3542, the disclosure of which is incorporated by reference in its entirety. In these embodiments, a coating solution of natural or synthetic melanin is created by adding a quantity the melanin (natural or synthetic) powder in a 2:1 mixture of ammonium hydroxide ($NH_4OH$) and water. In some of these embodiments, the coating solution is formed by adding approximately 140 mg of the melanin (natural or synthetic) powder in 3 mL of 2:1. mixture of ammonium hydroxide ($NH_4OH$) and water.

The solution is then stirred at room temperature for approximately 1 hour and subsequently sonicated for another 1 hour to yield a black solution. The solution is then. centrifuged at 3500-4000 rpm to separate any particulates from the solution that might affect the quality of film. In some other embodiments, the solution may be filtered to get remove the particulates. The supernatant from the centrifugation step or the filtered solution is then used for spin coating of melanin films into the contact lenses or previous low RI layers. The concentration of melanin in the $NH_4OH$: water mixture and/or the spinning speed can he adjusted to get different thicknesses of melanin films.

In various embodiments, the low RI layers can be also deposited on the lens surface by spin coating suitable low RI solution using known spin coating techniques. In some embodiments, the coating solution for a low RI $SiO_2$ coating solution may be formed as set forth in Huang, Y. Y. and Chou, K. S., 2003. Studies on the spin coating process of silica films, Ceramics international, 29(5), pp. 485-493, the disclosure of which is incorporated by reference in its entirety. In these embodiments, a silica precursor (tetraethyl orthosilicate, TEOS or tetramethyl orthosilicate, TMOS), ethanol, water, and hydrochloric acid (HCl) are first refluxed at 70 deg C. for 90 min in the following molar ratios 1:10:3.5:0.003. Subsequently, a quantity of a base catalyst (0.1 M $NH_4OH$) is added to 10 mL of the previous solution, which is then used for spin coating. The coating thickness can be controlled by varying the rotation speed.

In some other embodiments, the coating solution for a low RI $SiO_2$ coating solution may be formed using silica sols. In these embodiments, 4.5 mL of TEOS and 0.25 mL of 0.1 M HCl in 1.4 mL of DI water. The reaction mixture is placed in glass vials and. stirred for about 5 hours at about 300 rpm until the solution becomes visibly homogenous. The solution is further aged for about 24 hours and used as stock solution for preparation of thin films. The stock solution can be diluted with methanol to different extents to alter the viscosity and to obtain different thickness films.

In still other embodiments, solutions of polymers such as PMMA and PS can be prepared using toluene as a solvent. The solution is the spin coated on the lens surface to form a PMMA or PS low RI coating.

In another aspect, the present invention is directed to a method for forming the UV light protective contact lens described above comprising: rinsing a contact lens having a surface to be coated in deionized water; immersing a portion of the surface of a contact lens to be coated in a basic solution of dopamine hydrochloride for from about 1 hour to about 24 hours to deposit a layer of PDA on the surface of the contact lens; sonicating the contact lens to remove any loosely bound PDA oligomers from the surface of the contact lens; forming a solution of a silica precursor selected from the group consisting of tetraethyl orthosilicate (TEOS) and tetramethyl orthosilicate (TMOS) in ethanol and water and adding a silanation catalyst; coating the outer surface of said layer of PDA with the solution to form a layer of silicon dioxide; and repeating these steps as necessary to form a desired number of layers of PDA and silicon dioxide.

In yet another aspect, the present invention is directed to a method for forming the iridescent UV light protective contact lens described above comprising: applying a plasma treatment or corona treatment to a contact lens to be coated to increase the surface energy of said contact lens and promote wetting; spin coating a solution of natural or synthetic melanin dissolved in a 2:1 solution of ammonium hydroxide and water onto a surface of a the contact lens to form a layer of natural or synthetic melanin on said contact lens; applying a plasma treatment or corona treatment to said layer of natural or synthetic melanin to increase the surface energy and promote wetting; spin coating a silica solution created by mixing a silica precursor selected from the group consisting of tetramethyl orthosilicate (TMOS) or tetraethyl orthosilicate (TEOS), water, ethanol, and a silanation catalyst onto said layer of natural or synthetic melanin for form a layer of silicon dioxide over the layer of natural or synthetic melanin; applying a plasma treatment or corona treatment to the layer of silicon dioxide to increase the surface energy and promote wetting and repeating these steps as necessary to form a desired number of layers of natural or synthetic melanin and silicon dioxide.

EXPERIMENTAL

In order to better evaluate and further reduce the invention to practice, contact lenses were coated with polydopamine (PDA), a melanin polymer synthesized using dopamine precursor. As set forth above, similar procedures can be followed for other monomers listed above. Further, as an example, we show the calculations and procedure for alternating it with silica layer. As will be apparent, similar methodology (with varied deposition approach) could be employed for other organic polymers (as shown for PS) and other inorganic materials.

1. Deposition of PDA Coating.

Figure 7A:
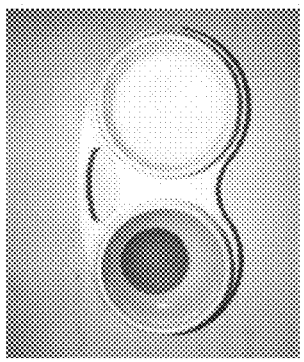
FIGS. 7A-C are images showing a contact lens coated with a layer of PDA.
Figure 7B:
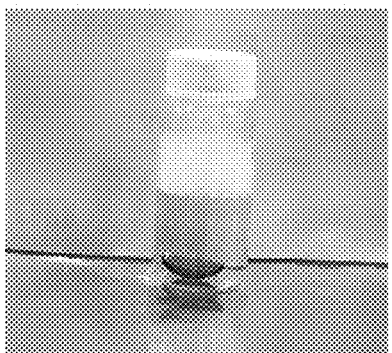
Figure 7C:
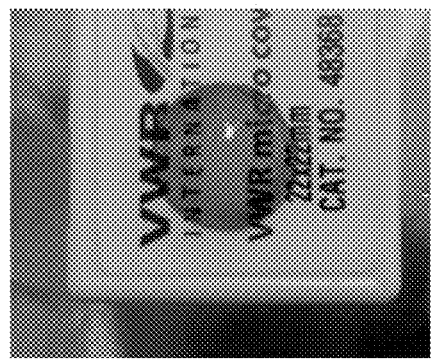

Commercial contact lenses were rinsed with deionized water to remove any traces of the lens cleaning solution. To deposit dopamine on the surface of contact lens, the contact lens was dipped in a basic solution of 0.5 mg/mL (or 1 mg/mL) dopamine hydrochloride (pH adjusted with Tris or sodium bicarbonate buffer). The reaction was allowed to proceed for 24 h to deposit a thin layer of PDA coating on the surface of the lens (See. FIGS. 7A-C). Afterwards, the lens was taken out from the PDA solution and rinsed with deionized water and sonicated in water for 15 min. This step enables the removal of any loosely bound oligomers from the contact lens surface. The PDA coated lens would be used for deposition of silica coating.

2. Deposition of Silica Coating.

The PDA-coated lens may be coated with silica using the well-established sol-gel Stober process. See, e.g., Yasuda, Nishikawa, K. and Furukawa, S., 2012. Structural colors from $TiO_2/SiO_2$ multilayer flakes prepared by sol-gel process. *Dyes and Pigments*, 92(3), pp. 1122-1125, the disclosure of which in incorporated herein by reference in its entirety. Briefly, tetraethyl orthosilicate (TEOS) solution is prepared using ethanol and water and the silanation reaction is catalyzed using HCl or $HNO_3$. The process (coating speed, and concentration of TEOS) may be adjusted to control the thickness of the silica layer. The PDA-silica-coated contact lens were used for further deposition of PDA and silica layers to create a multilayer assembly as shown in the FIG. 2.

3. Tuning the Color of Contact Lens.

The color of the contact lenses may be tuned by adjusting the thicknesses of the alternating layers or by choosing different RI materials, as set forth above. Since the color of the lens is a consequence of the multi-layer interference, the color does not fade over time. In addition, the polydopamine would enhance photoprotection to the wearer's eye by enhancing absorption of the UV and near visible light (400-500 nm) and quenching reactive oxygen species. The biocompatibility and strong adhesive nature of PDA also helps in creating mechanically robust coatings.

Figure 3:
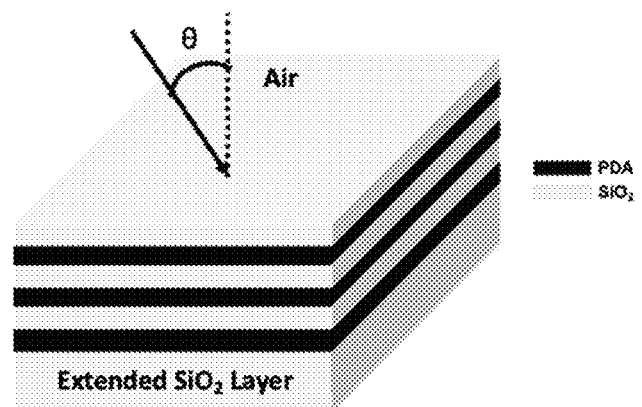
FIG. 3 is a schematic of the multilayer assembly of PDA and Silica used for the theoretical calculations, where light is incident at an angle $\theta$ with respect to the surface normal. The bottommost layer is an extended silica layer to represent the contact lens, while the topmost layer is air. The intermediate 6 layers consist of alternating PDA and silica layers with same thickness.
Figure 4A:
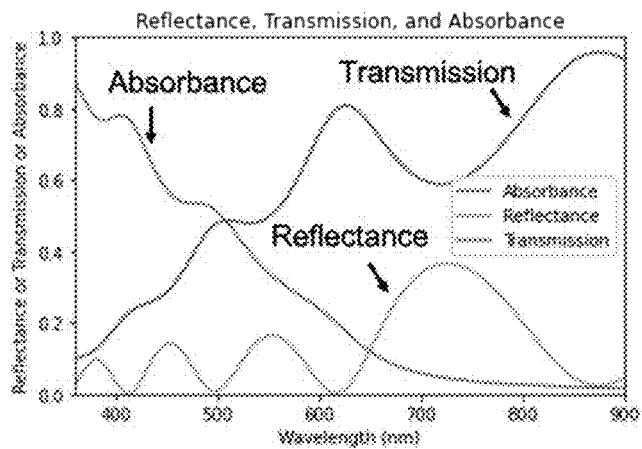
FIGS. 4A-C are graphs showing reflectance, transmission, and absorbance plotted as a function of wavelength for the different multilayer assemblies (Option 1 (FIG. 4A), Option 2 (FIG. 4B), and Option 3 (FIG. 4C) with alternating high RI black knot fungal melanin layer and low RI polystyrene (PS) layer shown in Table 1) that result in red color, determined using a genetic and machine learning algorithm (GMLA).
Figure 4B:
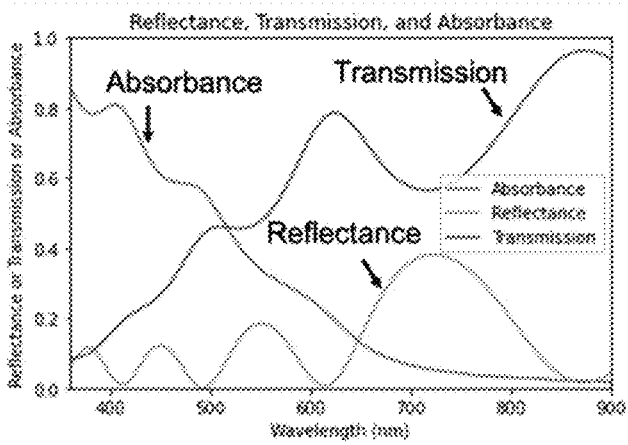
Figure 4C:
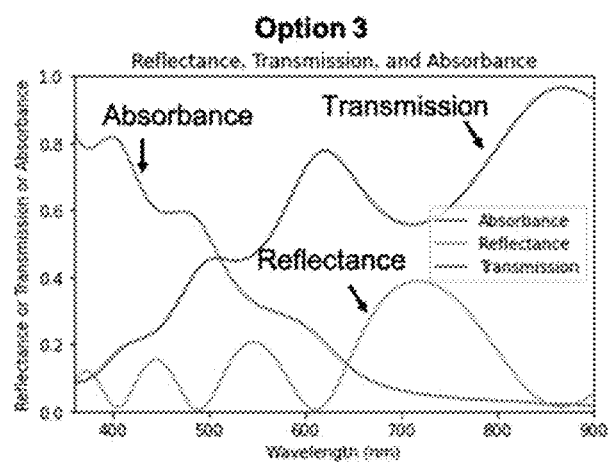
Figure 5A:
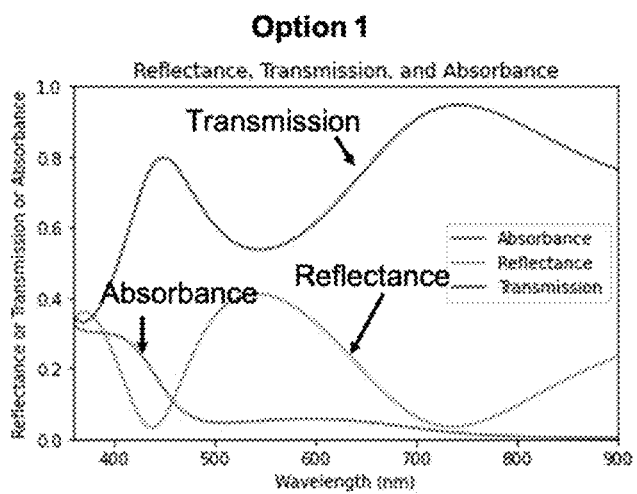
FIGS. 5A-B are graphs showing reflectance, transmission, and absorbance plotted as a function of wavelength for the different multilayer assemblies (Option 1 (FIG. 5A)and Option 2 (FIG. 5B) with alternating high RI black knot fungal melanin layer and low RI PS layer shown in Table 1) that result in green color, determined using GMLA.
Figure 5B:
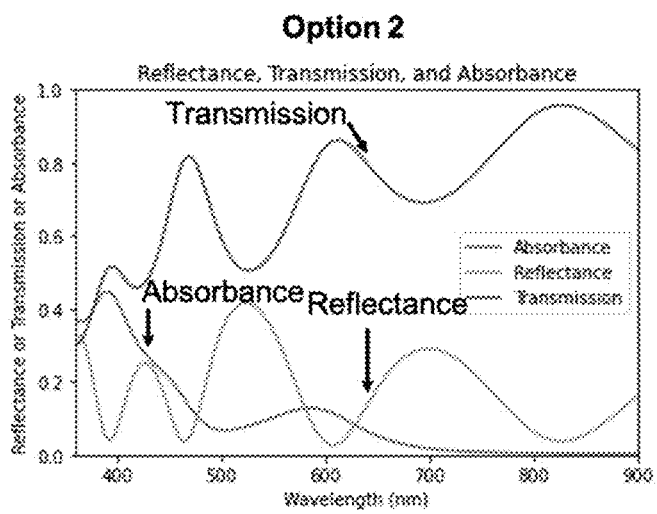
Figure 6A:
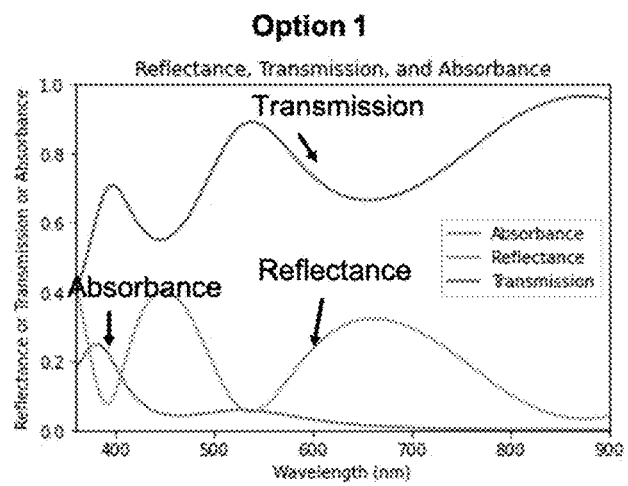
FIGS. 6A-B are graphs showing reflectance, transmission, and absorbance plotted as a function of wavelength for the different multilayer assemblies (Option 1 (FIG. 6A) and Option 2 (FIG. 6B) with alternating high RI black knot fungal melanin layer and low RI PS layer shown in Table 1) that result in blue color, determined using GMLA.
Figure 6B:
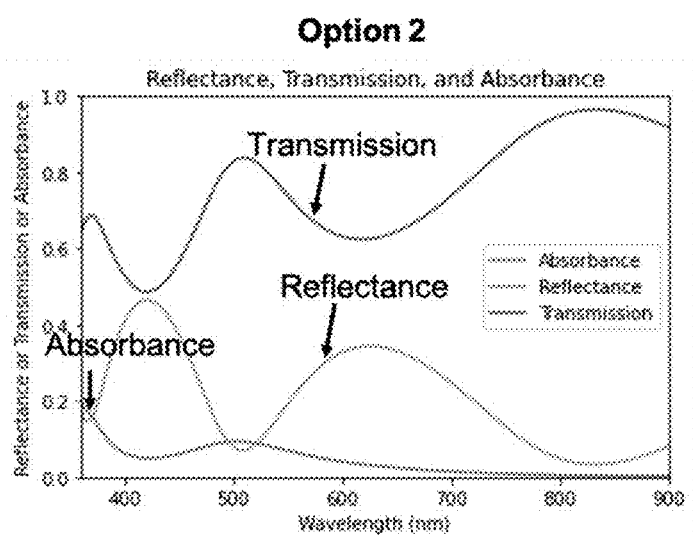
Figure 8A:
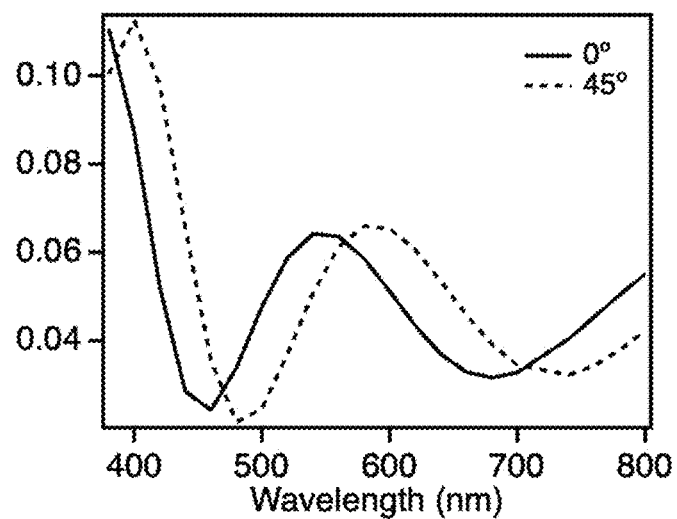
FIGS. 8A-B are reflectance spectra of the multilayer assembly shown in FIG. 3 with 60 nm thick intermediate layers at incident angles of 0° and 45° (FIG. 8A); and reflectance spectra of the multilayer assembly shown in FIG. 3 with varying thickness of the intermediate layers at 0° incident angle (FIG. 8B).
Figure 8B:
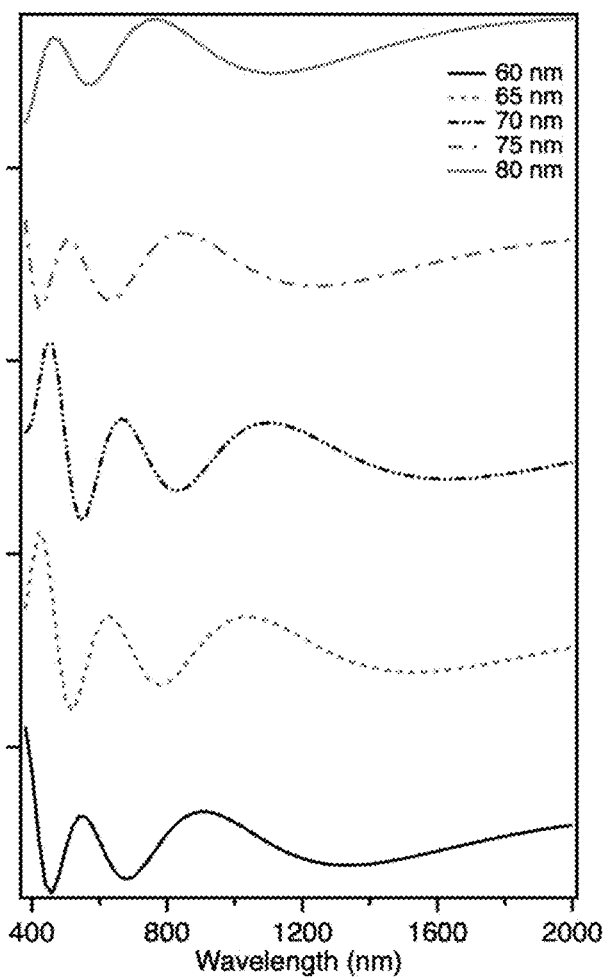

As an example showing how color changes as a function of thickness for $PDA-SiO_2$ alternating layers, we performed theoretical calculations to predict the reflectance spectrum of the multilayer film assembly. A total of 8 layers were used with the bottommost layer being an extended silica layer (representing the lens) and topmost layer being air as shown in FIG. 3. The in-between layers correspond to alternating layers of PDA and $SiO_2$ with similar thickness. The light is coming in at an angle $\theta$ with respect to the surface normal. The wavelength-dependent complex RI (including absorption), recently measured in our lab, was used for the melanin layer, while a fixed value of 1.5 was used for the silica layer for doing these calculations. For such a multilayer assembly with 60 nm thick intermediate layers and normal incidence ($\theta=0°$) of light, we observe a peak at ~550 nm in the reflectance spectrum within the visible range, thus the observed color would be green. The observed color would change to orange when viewed at $\theta=45°$ (FIG. 8A). Further, if the intermediate layer thickness is changed from 60-80 nm keeping the incident angle set to 0°, the reflectance spectrum changes in the visible spectrum resulting in different colors (FIG. 8B).

Figure 9A:
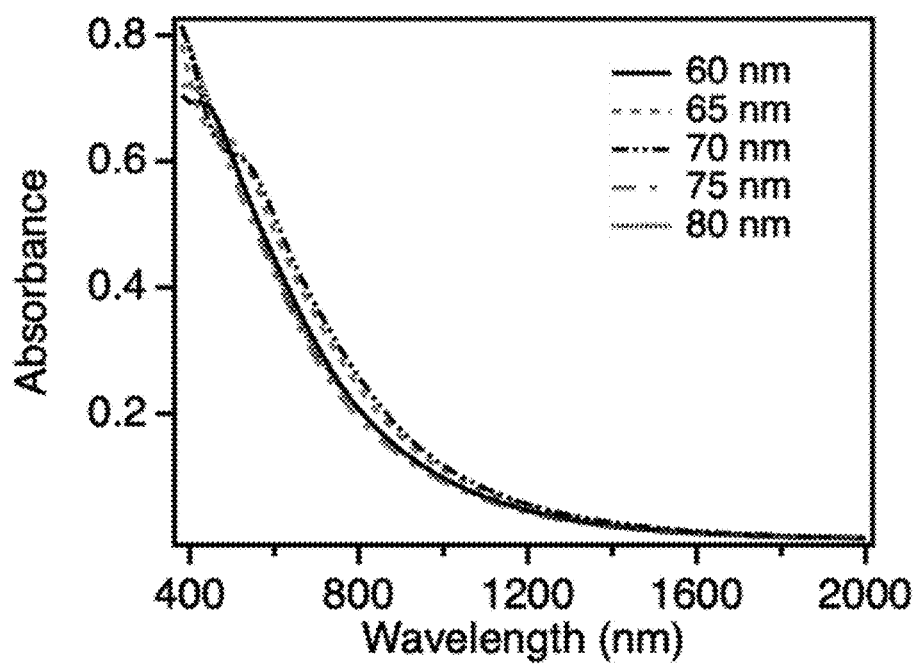
FIGS. 9A-B are graphs showing (a) absorbance (FIG. 9A) and transmittance (FIG. 9B) plotted as a function of wavelength for the multilayer assembly shown in FIG. 3 above with varying thickness of the intermediate layers at 0° incident angle.
Figure 9B:
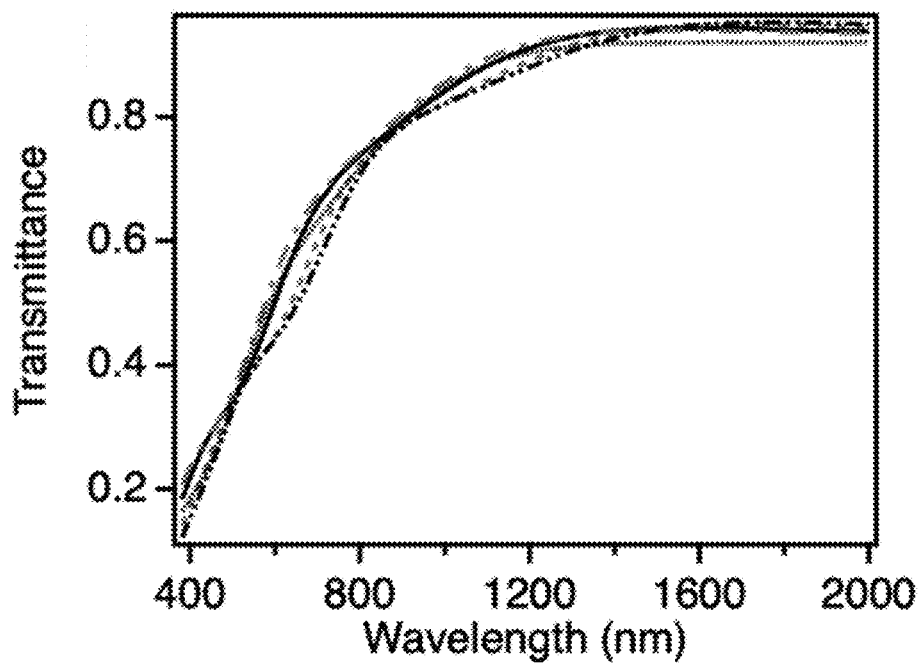

Besides calculating the reflectance spectra, we also calculated the absorbance and transmittance from such a multilayer assembly (FIGS. 9A-B). The presence of melanin layer enhances the absorption in the UV and near visible region, the wavelengths that are particularly damaging to the eye. The absorption and transmission do not change significantly with changing thickness of the intermediate layers demonstrating that the color could be tuned by varying thickness without affecting the overall transmission and absorption of the system.

In light of the foregoing, it should be appreciated that the present invention significantly advances the art by providing an iridescent UV protecting contact lens and coating that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An ultra-violet (UV) light protective contact lens comprising:
   a translucent lens portion that is sized to fit on the front of an eye; and
   a translucent iridescent coating comprising a plurality of alternating low refractive index (RI) and high RI layers adhered to said translucent lens portion;
   wherein the difference between the RI of the high RI layers and the low RI layers of said translucent iridescent coating is from about 0.2 to about 0.7;
   wherein each of said low RI and high RI layers reflect light in the visible spectrum and said iridescent coating produces one or more iridescent colors by the constructive interference of the light reflected by said low RI and high RI layers, and
   wherein one or more of said high RI layers absorbs UV light.

2. The UV light protective contact lens of claim 1, wherein said low RI layers have an RI of from about 1.3 to about 1.5.

3. The UV light protective contact lens of claim 1, wherein said high RI layers have an RI of from about 1.6 to about 2.0.

4. The UV light protective contact lens of claim 1, wherein said low RI layers have a thickness of from about 5 nm to about 600 nm.

5. The UV light protective contact lens of claim 1, wherein said high RI layers have a thickness of from about 5 nm to about 600 nm.

6. The UV light protective contact lens of claim 1, wherein the high refractive index layers comprise natural and synthetic melanin obtained by polymerizing different precursors: dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) or a combination thereof.

7. The UV light protective contact lens of claim 1, wherein the high RI layers comprise natural melanin, synthetic melanin, eumelanin allomelanin, PDA, DHN melanin, polynorepinephrine, polyDOPA, or polyepinephrine.

8. The UV light protective contact lens of claim 1, wherein the low RI layers comprise silicon dioxide, tetramethylmalonamide (TMMA), chitosan, polystyrene, poly(methyl methacrylate), polyelectrolytes, polycarbonates, polydimethylsiloxane, hydrogels, keratin, or a combination thereof.

9. The UV light protective contact lens of claim 1, wherein said translucent iridescent coating comprises from 2 to 15 alternating low RI and high RI layers.

10. The UV light protective contact lens of claim 1, wherein the high RI layers contain an organic polymer comprising the polymerized residue of a monomer selected from the group consisting of dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) and combinations thereof.

11. The UV light protective contact lens of claim 1, wherein the high RI and low RI layers are applied to said contact lens portion by sequential polymerization or spin coating.

12. The UV light protective contact lens of claim 1, wherein the high RI and low RI layers are applied to said contact lens portion by spin coating.

13. An iridescent UV protective coating secured to a contact lens comprising:
   a plurality of alternating low refractive index (RI) and high RI layers, the difference between the RI of said high RI layers and said low RI layers being from 0.2 to 0.7
   wherein each of said low RI and high RI layers reflect light in the visible spectrum and said iridescent coating produces one or more iridescent colors by the constructive interference of the light reflected by said low RI and high RI layers, and
   wherein one or more of said high RI layers absorbs UV light.

14. The iridescent UV protective coating of claim 13 wherein the iridescent color produced by said iridescent UV protective coating may be tuned by varying the thicknesses of the low RI and high RI layers.

15. The iridescent UV protective coating of claim 13 wherein said low RI layers have an RI of from about 1.3 to about 1.5.

16. The iridescent UV protective coating of claim 13 wherein said high RI layers have an RI of from about 1.6 to about 2.0.

17. The iridescent UV protective coating of claim 13 wherein said translucent iridescent coating comprises from 2 to 15 alternating low RI and high RI layers.

18. The iridescent UV protective coating of claim 13 wherein the high refractive index layers comprise natural melanin, eumelanin, allomelanin, synthetic melanin, polydopamine (PDA), polyDOPA, poly(DHN) or DHN melanin, polynorepinephrine, polyepinephrine, polytyrosine, or combinations thereof.

19. The iridescent UV protective coating of claim 13 wherein the low RI layers comprise silicon dioxide, tetramethylmalonamide (TMMA), chitosan, polystyrene, poly(methyl methacrylate), polyelectrolytes, polycarbonates, polydimethylsiloxane, hydrogels, keratin, or a combination thereof.

20. The iridescent UV protective coating of claim 13 wherein the high RI layers contain an organic polymer comprising the polymerized residue of a monomer selected from the group consisting of dopamine, L-3,4-dihydroxyphenylalanine (L-DOPA), catechol, 5, 6-dihydroxyindole (DHI), leucodopachrome, tryptamine, serotonin, 5,6-dihydroxyindole-2-carboxylic acid (DHICA), epinephrine, norepinephrine, tyrosine, adrenochrome, 1,8-dihyroxynapthalene (DHN) and combinations thereof.

21. A method for forming the UV light protective contact lens of claim 11 comprising:
   a. rinsing a contact lens having a surface to be coated in deionized water;
   b. immersing a portion of the surface of a contact lens to be coated in a basic solution of dopamine hydrochloride for from about 1 hrs to about 24 hrs to deposit a layer of PDA on the surface of the contact lens;
   c. sonicating the contact lens to remove any loosely bound PDA oligomers from the surface of the contact lens;
   d. forming a solution of a silica precursor selected from the group consisting of tetraethyl orthosilicate (TEOS)

and tetramethyl orthosilicate (TMOS) in ethanol and water and adding a silanation catalyst;
e. coating the outer surface of said layer of PDA with the solution of step D to form a layer of silicon dioxide; and
f. repeating steps A through E as necessary to form a desired number of layers of PDA and silicon dioxide.

22. A method for forming the UV light protective contact lens of claim 12 comprising:
a. applying a plasma treatment or corona treatment to a contact lens to be coated to increase the surface energy of said contact lens and promote wetting;
b. spin coating a solution of natural or synthetic melanin dissolved in a 2:1 solution of ammonium hydroxide and water onto a surface of the contact lens to form a layer of natural or synthetic melanin on said contact lens;
c. applying a plasma treatment or corona treatment to said layer of natural or synthetic melanin to increase the surface energy and promote wetting;
d. spin coating a silica solution created by mixing a silica precursor selected from the croup consisting of tetramethyl orthosilicate (TMOS) or tetraethyl orthosilicate (TEOS), water, ethanol, and a silanation catalyst onto said layer of natural or synthetic melanin for form a layer of silicon dioxide over the layer of natural or synthetic melanin of step B;
e. applying a plasma treatment or corona treatment to the layer of silicon dioxide in step D to increase the surface energy and promote wetting and repeating steps A through D as necessary to form a desired number of layers of natural or synthetic melanin and silicon dioxide.

* * * * *